(No Model.) 2 Sheets—Sheet 1.
J. A. RUTHERFORD.
TREE EXTRACTOR AND CARRIER.
No. 578,836. Patented Mar. 16, 1897.
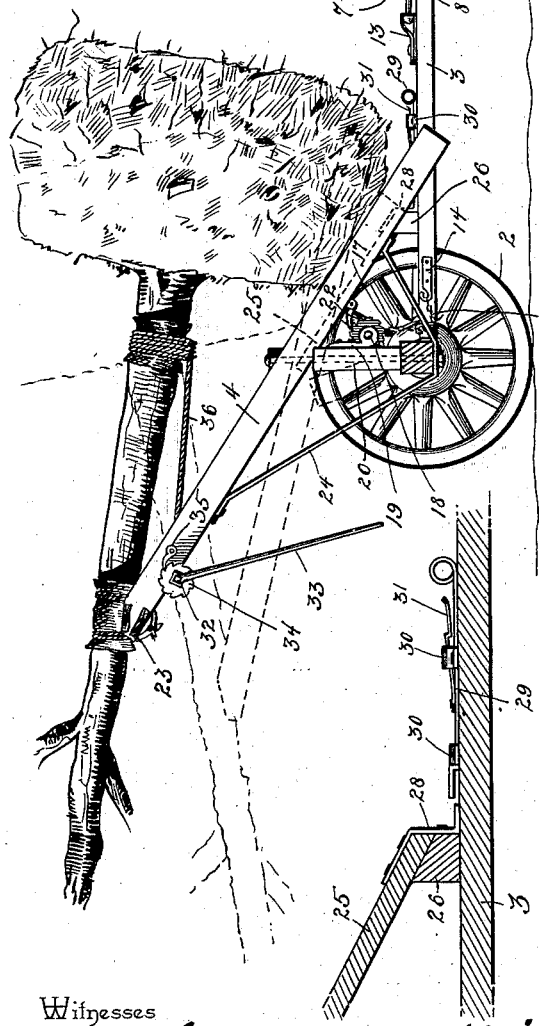
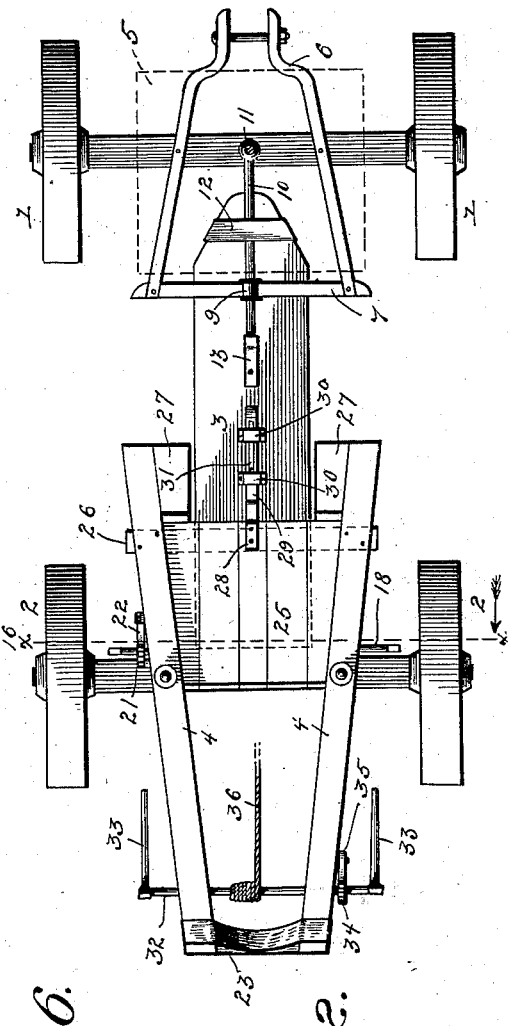
Witnesses
E. N. Monroe
V. B. Hillyard.
Inventor
John A. Rutherford
By his Attorneys,
C. A. Snow & Co.

(No Model.) 2 Sheets—Sheet 2.
J. A. RUTHERFORD.
TREE EXTRACTOR AND CARRIER.
No. 578,836. Patented Mar. 16, 1897.
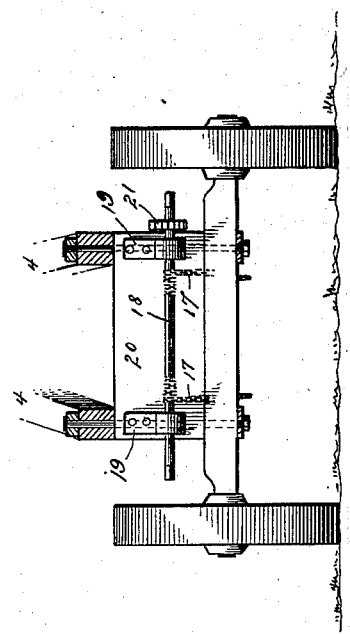
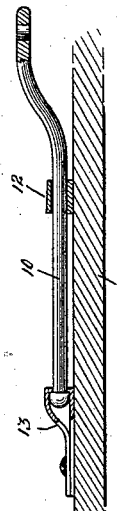
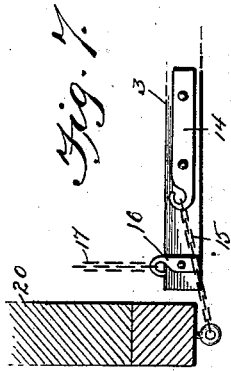
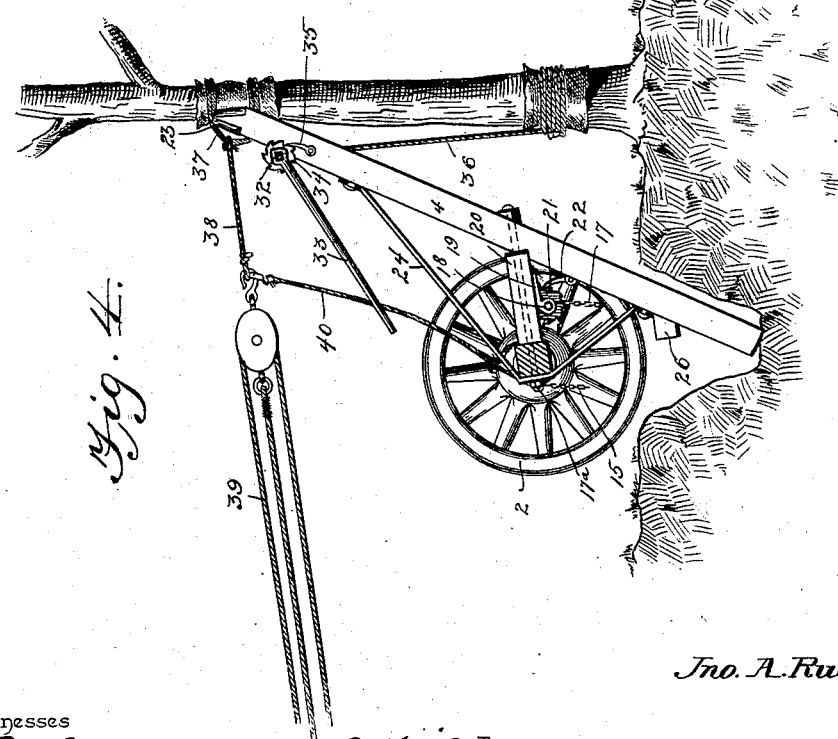
Witnesses
E. N. Monroe
V. B. Hillyard
Inventor
Jno. A. Rutherford,
By his Attorneys,
C. A. Snow & Co.

UNITED STATES PATENT OFFICE.

JOHN A. RUTHERFORD, OF HYATTVILLE, OHIO.

TREE EXTRACTOR AND CARRIER.

SPECIFICATION forming part of Letters Patent No. 578,836, dated March 16, 1897.

Application filed September 9, 1896. Serial No. 605,328. (No model.)

*To all whom it may concern:*

Be it known that I, JOHN A. RUTHERFORD, a citizen of the United States, residing at Hyattville, in the county of Delaware and State of Ohio, have invented a new and useful Tree Extractor and Carrier, of which the following is a specification.

This invention relates to that class of apparatus for extracting, transplanting, and carrying trees and aims to improve the general construction and increase the effectiveness of this class of machines without materially adding to the cost of manufacture as compared with apparatus of like size and capacity.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of a tree extractor and carrier constructed in accordance with the principles of this invention, showing a tree loaded thereon and the axles in section and illustrating by dotted lines the position assumed by the derrick and tree when the rear truck is used alone as means for transporting the load. Fig. 2 is a top plan view of the improved extractor and carrier. Fig. 3 is a section about on the line X X of Fig. 2, looking in the direction indicated by the arrow. Fig. 4 illustrates the rear truck and derrick applied to the tree to be extracted. Fig. 5 is a detail view of the roller connection between the front truck and the coupling-board. Fig. 6 is a detail view of the locking connection between the derrick and the coupling-board. Fig. 7 is a detail view showing the draft connections between the coupling-board and the rear truck.

Corresponding and like parts are referred to in the following description and indicated in the several views of the accompanying drawings by the same reference-characters.

The device comprises in its general organization a front truck 1, a rear truck 2, a coupling-board 3, connecting the two trucks, and a derrick 4, the latter being mounted upon the rear truck. A box 5 is mounted upon the front truck and is adapted to receive tools, block and tackle, and other accessories.

The hounds 6 are connected at their rear ends by a cross-bar 7, operating loosely through a clip 8, secured to the coupling-board 3, and having a roller 9 to travel upon the top side of the bar 7. A rod 10 is secured at its front end to the axle of the forward truck by means of a king-bolt 11, and is rockably mounted in a block 12 near the front end of the coupling-board 3 and in a bracket 13, secured to the part 3 a short distance in the rear of the block 12. The rear end of the rod 10 is headed to prevent its pulling through the bracket 13 and enable it to sustain the draft when the device is drawn over the ground. By reason of the connections just described the front truck can move about a vertical axis to pilot the device and can tilt about a horizontal axis to admit of the trucks adapting themselves to inequalities in the surface of the ground without subjecting the coupling-board or other part to torsional strain.

The rear portion of the coupling-board is provided at its edges with hooks 14, which are connected by draft-chains 15 with the axle of the rear truck, and is supplied with other hooks 16, to which elevating-chains 17 are attached, the upper ends of the elevating-chains being secured to a windlass 18, journaled in bearings 19, secured to a bolster 20, mounted upon the rear axle. The windlass 18 is prevented from turning backward by a ratchet-wheel 21, applied thereto, the teeth of which are engaged by means of a pawl 22, provided on the derrick 4. The ends of the windlass 18 are extended and made angular, and are adapted to have a wrench or handle detachably fitted thereto for turning the windlass to wind the chains 17 thereon when it is required to elevate the rear end of the coupling-board when bringing the parts together.

The derrick 4 is of oblong form and comprises side bars which converge toward their upper or rear ends, and which are connected by a cross-bar 23, made hollow in its top side to form a saddle, in which the trunk of the tree to be extracted is to be seated. The derrick normally inclines upwardly and rearwardly, and is firmly secured between its ends to the bolster 20 and rear axle, and is strengthened by truss-braces 24, which are secured at their ends to the side bars of the derrick and between their ends to the rear axle. A platform 25 is provided between the ends of the derrick and forms a base upon which the block of earth clinging to the roots of the tree rests. This platform consists of a series of boards placed edge to edge and extending between the side bars, the upper rear ends resting upon the bolster 20 and the lower front ends bearing upon a cross-bar 26, secured near its ends to the said side bars.

Blocks 27 are attached to the inner sides of the side bars, and their upper or inner ends touch the platform 25, and these blocks 27 come upon opposite sides of the coupling-board 3, thereby giving strength and stability to the device. An iron 28 is secured to the lower end of the platform 25 and the cross-bar 26, and is adapted to be engaged by a latch-bar 29, slidably mounted in keepers 30, secured to the coupling-board 3, and provided with a locking-spring 31 to secure it when in engagement with the part 28, thereby holding the derrick and coupling-board in proper relation. A windlass 32, similar in formation to the windlass 18, is journaled near the upper end of the derrick and is adapted to be rotated by handles 33, fitted to the ends thereof, and is held against backward rotation by a ratchet-wheel 34 and a pawl 35. A rope 36 has one end secured to the windlass 32 and is adapted to be wound thereon, and its opposite end is made fast to the trunk of the tree to be extracted when the device is in operation.

The tree to be extracted, transplanted, or carried off has a trench dug in the ground about its roots, and the rear truck being uncoupled has the lower end of the derrick dropped into the trench and its upper end arranged to bear against the trunk of the tree with the latter fitting in the hollow of the cross-bar 23. The free end of the rope 36 is secured to the trunk of the tree near its base and the windlass 32 turned, so as to create a tension upon the rope 36 and produce an upward pull upon the tree. A rope 37 has its ends secured to the trunk of the tree opposite the cross-bar 23 and looped about the latter, and a rope 38 is made fast to the loop, and a block and tackle 39 is applied to the outer end of the rope 38 to create a lateral pull upon the tree toward the derrick, whereby the tree is uprooted. Draft-ropes 40 are secured to the axle of the rear truck and connect with the block and tackle, so that after the tree is uprooted power applied by means of the block and tackle will move the truck and its load away from the trench. To connect the rear truck with the coupling-board, the chains 17 are slackened and connected with the hooks 16, and the windlass 18 is operated to elevate the rear end of the coupling-board 3 to the proper position, after which the draft-chains 15 are coupled to the hooks 14, when the tree can be carted away to the desired location.

Having thus described the invention, what is claimed as new is—

1. In a tree extractor and carrier, the combination of front and rear trucks, a coupling-board, and a rod having pivotal connection at one end with a truck and rockably connected with the coupling-board, whereby the said truck is adapted to turn about a vertical and a horizontal axis, substantially as and for the purpose set forth.

2. In a tree extractor and carrier, the combination of front and rear trucks, a coupling-board, a rod rockably connected with the coupling-board and having pivotal connection with a truck, hounds secured to the movable truck and having a rear connecting-bar, and a clip secured to the coupling-board and adapted to have the connecting-bar of the hounds operate loosely therethrough, substantially as set forth.

3. In a tree extractor and carrier, the combination of a truck having a high bolster, a derrick secured to the bolster intermediate of its ends, a truss-brace for strengthening the derrick, a platform near the inner or lower portion of the derrick forming a base for the roots of the tree, and a windlass near the upper end of the derrick for winding up the rope secured to the base portion of the tree, substantially as and for the purpose set forth.

4. In a tree-extractor, the combination of a derrick adapted to be stood on end and having its upper portion resting against the tree to be uprooted, means for securing the upper portion of the derrick to the tree, a truck secured to the derrick between its ends and forming a fulcrum therefor, a block and tackle independent of the truck and derrick for extracting the tree, and draft-ropes between the block and tackle and the truck, whereby a continued application of the force applied for uprooting the tree will move the loaded truck away from the trench provided to receive the lower end of the derrick, substantially as and for the purpose set forth.

5. In a tree extractor and carrier, the combination of a truck, a coupling-board, a derrick mounted upon the truck intermediate of its ends and comprising longitudinal bars and an intermediate platform, and a latch-bar slidingly mounted upon the coupling-board and adapted to engage with a projecting portion of the derrick to secure the latter to the coupling-board, substantially as set forth.

6. In combination, a truck, a derrick mounted upon the truck, a coupling-board, draft-chains for connecting the coupling-board to the truck, and a windlass and elevating-chains mounted upon the truck and adapted to make connection with the coupling-board for lifting the latter to admit of the draft-chains being attached thereto, substantially as set forth.

7. In combination, a coupling-board, a truck, a derrick mounted upon the truck and comprising side bars and an intermediate platform, and blocks secured to the lower ends of the said side bars and coming upon opposite sides of the coupling-board, substantially as shown for the purpose described.

In testimony that I claim the foregoing as my own I have hereto affixed my signature in the presence of two witnesses.

JOHN A. RUTHERFORD.

Witnesses:
R. R. WINTERS,
JOHN S. JONES.